Aug. 4, 1953  E. J. KACZOR ET AL  2,648,021
STATOR CONSTRUCTION FOR MOTORS AND GENERATORS
Filed April 17, 1951  2 Sheets-Sheet 1
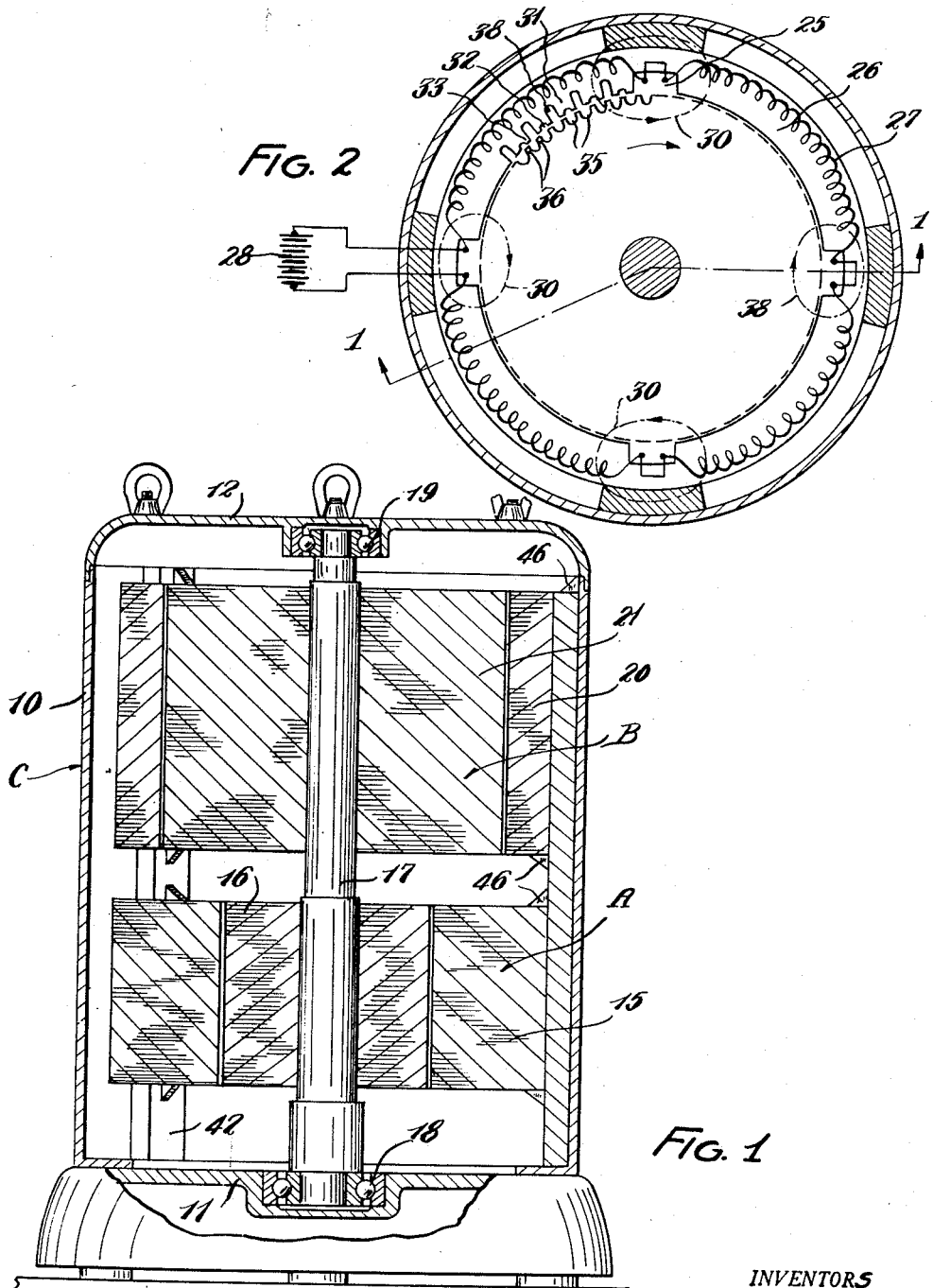
INVENTORS
Edward J. Kaczor
BY Clarence F. Schwan
Alfred C. Body
ATTORNEY Patented Aug. 4, 1953

2,648,021

UNITED STATES PATENT OFFICE 2,648,021

STATOR CONSTRUCTION FOR MOTORS AND GENERATORS

Edward J. Kaczor and Clarence F. Schwan, Cleveland, Ohio, assignors to The Ohio Crankshaft Company, Cleveland, Ohio, a corporation of Ohio Application April 17, 1951, Serial No. 221,502

8 Claims. (Cl. 310—168)

This invention pertains to the art of electric motors and generators and, more particularly, to an improved stator construction for such equipment.

The invention is particularly adapted for use in high-frequency generators of the inductor-alternator type and will be described with reference to such equipment, although it will be appreciated that the invention has broader applications.

The stator of an induction-alternator type high-frequency generator is generally cylindrical in shape and comprises a stack of thin, magnetically-permeable laminations in the form of a complete circle punched from a strip or sheet of magnetic material, the width of which sheet is determined primarily by the outer diameter of the laminations desired. Because of the high-frequency magnetic fields present in such generators, the material from which the laminations is made must be of the highest quality in order to reduce eddy current and other electrical losses. Such material is expensive. Accordingly, it is desirable to use as small an area of metal for each lamination as possible and to punch this lamination from as narrow a width of strip as is necessary to produce the desired diameter of lamination.

The dimension of the stator must be so proportioned that there is always sufficient cross-sectional area to carry the flux concentrations required to produce the power and voltages desired. The inner diameter of the stator is determined by the rotor diameter and the required air gap. Heretofore, the outer diameter has been determined, to a large extent, by the depth of the field-coil slots which are normally formed on the inner surface of the stator and the amount of field-coil flux which must be carried by the portions of the stator behind the field-coil slots. These field-coil slots, it will be realized, cut into and reduce the cross-sectional area of the laminations behind the slots.

Prior to this invention, the outer diameter of the stator laminations was made sufficiently large to provide a cross-sectional area behind the field-coil slots sufficient to handle the maximum field-coil flux without flux saturation. This resulted in a cross-sectional area of laminations between adjacent field-coil slots much greater than that necessary to carry the field-coil flux without flux saturation. Obviously, the outer dimensions of the laminations between the adjacent field-coil slots could be reduced but, outside of reducing the stator weight, this would not do any good because the material saved would be part of the strip material left after the lamination is punched and this is scrap material anyway.

The present invention contemplates a stator construction which requires a minimum width of strip for the stator punching, which has a minimum area of lamination in the stator punching but which is still capable of efficient power generation.

In accordance with the present invention, the outer diameter of the stator lamination is reduced so that the area of lamination radially outwardly of or behind the field-coil slots is reduced below that necessary to carry the field-coil flux or even eliminated and the reduced area behind the stator slot is then built back up by a flux-bridging member having a circumferential width greater than that of the slots and a radial thickness sufficient to carry the field-coil flux without saturation. This flux bridge is required to carry only unidirectional flux and, therefore, may be made a solid magnetically-permeable member extending parallel with the field-coil slot and can also serve as a frame stiffener.

The principal object of the invention is the provision of a new and improved stator for electric motors and generators which is simple in construction; strong structurally; employs a minimum amount of magnetic-lamination material and is efficient electrically.

Another object of the invention is a new and improved stator for equipment of the type referred to comprising a cylindrical sleeve of magnetic material with field-coil slots in the inner surface of the sleeve having a depth approaching the radial thickness of the sleeve and flux-bridging members in abutment with the outer surface of the sleeve opposite the slot, these members having a circumferential width greater than that of the slot and a radial thickness to carry, in conjunction with the material behind the slots, the field-coil flux without danger of saturation.

The invention will be defined and set forth specifically in the claims appended to the end of this specification.

The invention, as defined in these claims, may be embodied in a number of different-appearing parts and arrangement of parts, a preferred embodiment of which will be described in this specification in detail and illustrated in the accompanying drawings which are a part hereof, and wherein:

Figure 1 is a side sectional view, somewhat schematically, of a high-frequency motor generator of the inductor-alternator type embodying the present invention, Figure 1 being a section of Figure 2 taken on the line 1—1 thereof;

Figure 2 is a cross-sectional view of the upper half, namely, the inductor-alternator portion of Figure 1, with the field-coil windings being shown somewhat schematically;

Figure 3:
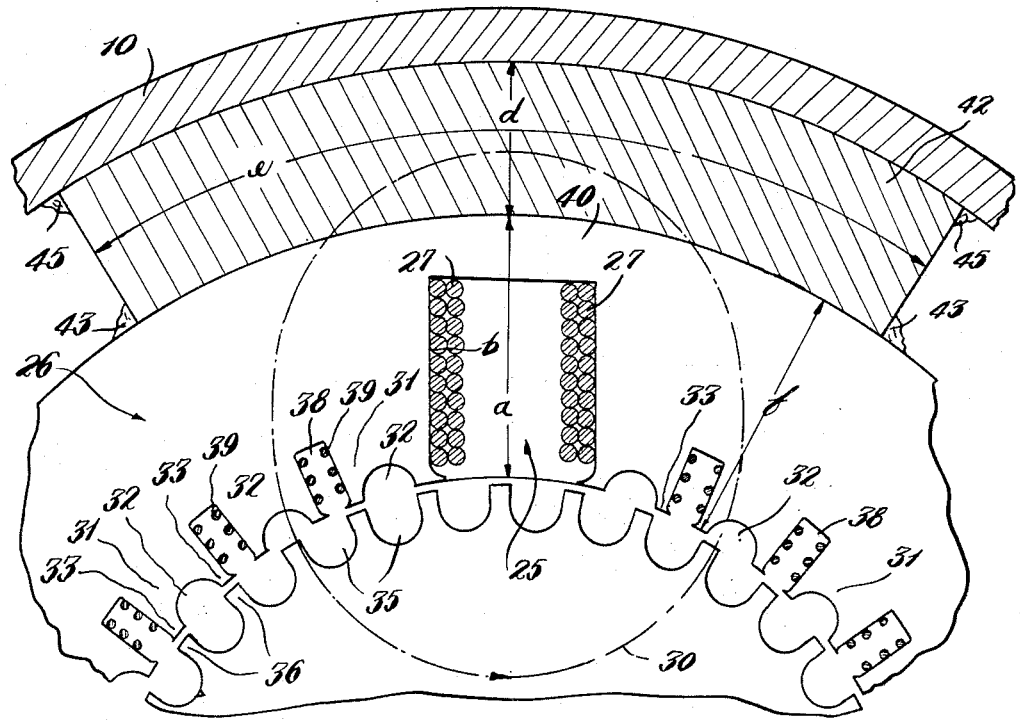
Figure 3 is a fragmentary portion of Figure 2, greatly enlarged, showing details of the slot and flux-bridge construction.

Referring now to the drawings wherein the showings are for the purpose of illustrating the invention only and not for the purposes of limiting the invention, Figures 1 and 2 show a motor A driving a high-frequency generator of the inductor-alternator type B, both contained in a housing C.

The housing C may be of any conventional construction and is shown relatively schematically as an outer cylindrical shell 10 with a vertical axis and end bells comprising a base 11 and top 12.

The motor A may also be of any conventional construction and comprises generally a stator 15 and a rotor 16 mounted on a shaft 17 which, in turn, is supported for rotation in bearings 18, 19 in the base 11 and top 12 respectively. The motor construction is conventional and will not be further described here. In the preferred embodiment, the motor has a rotor speed approximating 3600 R. P. M.

The generator B is comprised of a stator member 20 and a rotor member 21 mounted on the shaft 17 and, thus, directly driven by the motor rotor 16. The generator rotor 21 is conventional in construction and will not be further detailed here. Generally, it is comprised of a stack of relatively thin, magnetically-permeable laminations.

The generator stator 20 comprises a generally cylindrical sleeve of magnetically-permeable material which, in the embodiment shown, is made up of a stack of thin, circular laminations punched from a flat sheet or strip. This sleeve has an inner cylindrical surface coaxial with the axis of the shaft 17 and, preferably, close spaced to the outer surface of the generator rotor 21. In the embodiment shown, the generator stator 20 has four axially extending field-coil slots 25 opening from the inner surface thereof and equally spaced therearound. While there are four field-coil slots shown, obviously, more or less may be employed. The field-coil slots 25 divide the stator into four field poles 26 symmetrically arranged around the axis of rotation of the rotor 21. Field coils 27, shown schematically in Figure 2, are wound in the field-coil slots 25 and around the poles 26. The field coils 27 are connected in electrical series relationship with a D. C. energizing power source 28 and, when energized, generate a magneto-motive force in each field pole 26, tending to create a flux loop as shown by the dotted lines 30, around each slot 25; i. e., behind the slots 25, through the field poles 26, across the air gap and into the generator rotor 21. The coils may be connected otherwise, if desired.

The rotor-facing surface of each field pole 26 has a plurality of armature-coil slots 38 formed therein defining armature poles 31 therebetween. Armature windings 39 are disposed in these armature-coil slots 38. The rotor-facing surface of each armature pole 31 has a slot 32 extending the length thereof dividing the rotor-facing surface of each armature pole 31 into a pair of armature-pole teeth 33. The outer surface of the rotor 21 has a plurality of alternate slots 35 and rotor teeth 36. The slots 32 and 35 are of approximately equal width while the width of the teeth 36 are approximately one-half the width of the slots 35. Thus, the pitch of the slots 35 is less than the pitch of the slots 32, the ratio being approximately three armature-pole slots 32 to four rotor slots 35 in the embodiment shown. Obviously, other ratios than that shown may be employed.

In operation, the field coils 27 are energized from a D. C. power source creating the flux loop 30. This flux passes through the armature-pole teeth 33, across the air gap, to the rotor and into the rotor. With a constant magneto-motive force in each field coil 27, the flux in each armature pole will be determined by the effective air gap between the armature pole and the rotor. Referring particularly to the armature pole indicated by the letter $m$, it will be noted that the corresponding rotor tooth is opposite the slot 32 and the effective air gap and reluctance for this field pole is a maximum. The flux in the armature pole will, therefore, be a minimum. On the other hand, referring to the armature pole marked $n$, it will be noted that the corresponding rotor teeth are opposite the teeth 33 of this armature pole and the effective air gap and reluctance is a minimum and the flux in this armature pole will be a maximum. As the rotor rotates, the rotor teeth alternately align with and become disaligned with the teeth of the armature pole, thus increasing and decreasing the effective air gap and the flux of the pole. The change in flux generates a high-frequency voltage in the armature coils at a frequency which is a function of the number or rotor teeth 36 and armature poles and the speed of rotation of the rotor. This high-frequency variation in the flux density in the armature pole would tend to generate eddy current in the armature poles themselves were it not for the fact that the armature poles are made of special laminated material having the characteristic of low eddy-current losses.

In the usual inductor alternator, the slots 32 and 35 in the stator and rotor are necessary design features. In effect, however, they reduce the effective area through which flux may flow. As the flux density without saturation is limited, this reduced area determines the maximum air-gap flux. In other words, when the pinch point, wherever it may be, in the magnetic loop becomes saturated by increasing the magneto-motive force of the field coils, then further increases in the magneto-motive force will not further increase the flux. The area of the teeth is the pinch point in the magnetic circuit of the usual inductor alternator. Obviously, there may be other pinch points in the flux loop 30.

In the embodiment of the invention shown, the field-coil slots 25 have a depth substantially equal to or approaching the radial thickness $f$ of the stator laminations, leaving a narrow portion 40 extending behind the field-coil slots 25 and mechanically joining the portions of the laminations forming the individual poles 26. The cross-sectional area of the portion 40 is less than the area of the teeth 33 facing the rotor 21. The portion 40, thus, except for the invention, would become a pinch point in the magnetic loop 30, limiting the maximum amount of magnetic flux which could be developed by the field coils 27.

Heretofore, and prior to the present invention, it has been the practice to make the radial width $f$ of the stator 20 such that the portion 40 would have a cross-sectional area greater than the area of the teeth 33 facing the rotor; that is to say, the cross-sectional area of the portion 40 was sufficiently large so that it would not be a pinch point in the magnetic loop 30. The maximum diameter of the stator laminations is determined by the diametrical distance between the bases of opposite slots 25 plus the thickness $c$ of the portion 40 behind or forming the base of the slot 25. Thus, if the portion 40 is not to be a pinch point, it will be seen that a much larger diameter of stator lamination must be provided and, as the diameter of the lamination determines the width of the strip from which it must be punched, it will be seen that a much wider strip must be provided than that which may be used by the present invention. Also, portions of the lamination between the field-coil slots will have a low flux density indicating an excess of lamination material. Nothing is to be gained by reducing the outer diameter of the field poles. Any reductions here simply turn up as more scrap in the strip after the punchings are made.

In accordance with the present invention, the cross-section area of the portion 40 is purposely made less than the area of the teeth 33 so that it will be a pinch point in the magnetic loop and a flux bridge in the form of a member 42 of magnetically-permeable material is provided behind each slot 25. The member 42, for reasons which will appear, may be made of a solid, nonlaminated magnetic material as distinguished from the portion where the armature windings 39 are located which must be so constructed as to reduce eddy-current losses caused by high-frequency flux fields. The inner surface of the member 42 is formed to fit flush with and in firm abutting engagement with the outer surface of the stator laminations and is welded thereto at the edges as at 43. The radial thickness $d$ and width $e$ of the member 42 is, preferably, such that any cross-sectional area through the member 42 and the portion 40 is greater than the area of the teeth 33 facing the rotor 21. The width $e$ of the member 42 is, preferably, at least three times as wide as the width of the slots 25. With such a construction, it will be seen that the flux of the loop 30 can readily pass into the member 42 and, in effect, a flux bridge has been provided for each slot 25, whereby the thickness $d$ of the portion 40 may be reduced to any desired amount without adverse effect on the operation of the generator.

The dimensions of the member 42 are so proportioned that at no time in the actual operation of the generator will the flux density reach a value such as to magnetically saturate the material of the member 42. With commercially available steel, this value is in the region of 70,000 to 80,000 magnetic lines per square inch as distinguished from the value of approximately 100,000 magnetic lines per square inch for the laminations of the stator. Obviously, if the member 42 is made of a material which saturates at a lesser or greater flux density, the dimensions may be proportioned correspondingly.

The width $e$ of the member 42 relative to the width of the slot 25 must be such that the ends of the member 42 overlap the sides of the slots 25 by an amount such that the minimum cross-sectional area of metal between the sides of the slot 25 and the outer surfaces of the member 42 is at least equal and preferably greater than the area of the teeth 33 facing the rotor 21, the determining factor being the flux-saturation point of the material of the member 42. In this way, the pinch point in the magnetic circuit will be determined by the area of the teeth 33 facing the rotor 21. However, as stated, the limited area of the teeth 33 facing the rotor 21 is a necessary design limitation in order for the generator to function at all and, by maintaining the minimum cross-sectional areas referred to above, it will be seen that the operation of the generator will be limited only by its essential design features and not by some other area of the machine which, because of improper design or skimping on materials, would become the limiting factor on its operation.

The member 42 may be of solid material as the flux therein is generally constant. If all the rotor teeth 36 were aligned with the stator slots 32 simultaneously and then aligned with the stator teeth 33, the permeance of the field-coil flux circuit would vary and there would be some high-frequency flux variations in the portion 40 of the laminations and in the member 42 which were not damped out by the field coils. As the member 42 is of solid material, some eddy currents would be generated therein.

In the embodiment of the invention shown, however, it will be noted that the reluctance of the flux path through alternate armature poles at any one instant is, alternately, a minimum and a maximum, the effect being to maintain the average reluctance for the field-coil magnetic path generally constant and, thereby, preventing or reducing high-frequency variations of flux behind the field coils and the generation of eddy currents in the member 42.

As shown, the member 42 is disposed between the outer shell 10 and the stator 20. The member 42 is welded as at 45 to the outer shell and forms a transverse stiffening member therefor, in addition to the function of providing a flux bridge for the back of the field-coil slot 25.

For the purposes of the invention, the flux bridge 42 need only have a length equal to the length of the generator stator 20. However, for the purposes of providing a stiffener for the shell 10, the member 42 preferably extends the entire length of the housing C. Gusset plates 46 welded onto the inner surface of the member 42 at the top and bottom of both the generator stator and the motor stator serve to retain these members in position during operation of the equipment.

Figure 4:
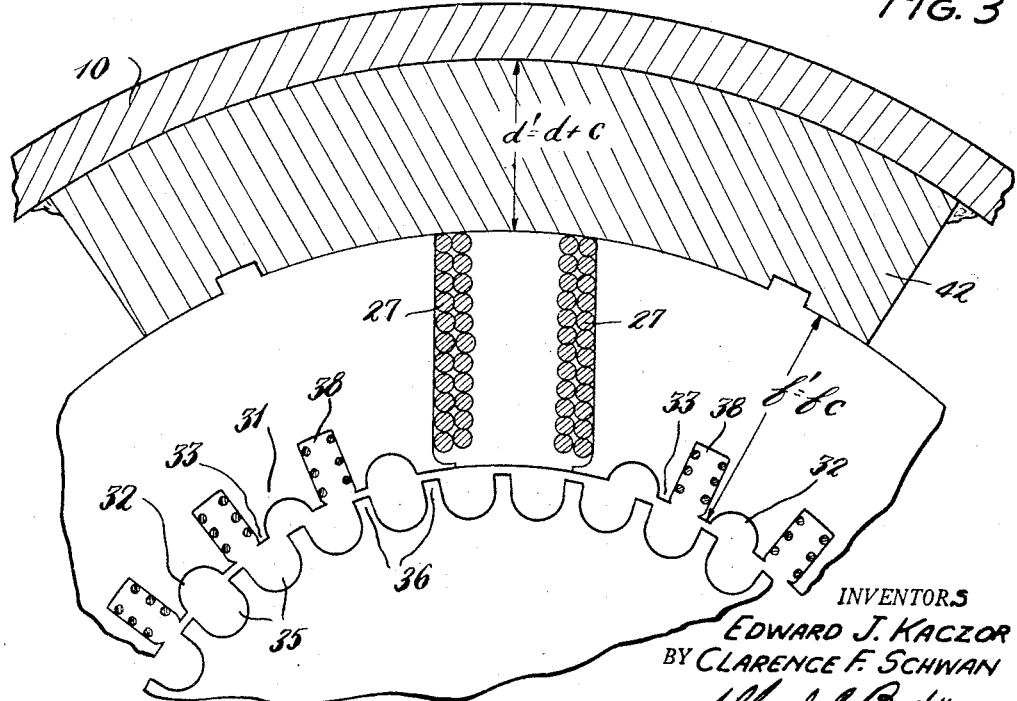
Figure 4 is a view similar to Figure 3 showing an alternative arrangement of the invention.

As there is little or no high-frequency flux variation behind the field-coil slots 25, it will be seen that, in accordance with the present invention, the portion 40 of the stator could be eliminated entirely somewhat as is shown in Figure 4 with a further reduction in the usage of lamination material. In this case, the width $d$ of the member 42 has been increased to compensate for the reduction in the flux-carrying area of the portion 40.

The preferred embodiment employs the portion 40 as a bridge connecting the portions of the stator forming the field pole. The advantages of these portions in accurately locating the field poles and in aiding in the manufacture and assembly of the stator as an integral unit greatly outweigh any savings in magnetic material that might be obtained by further reducing the diameter of the stator member so as to eliminate the portion 40.

An example of the savings possible with the present invention can be illustrated by reference to data on a typical inductor alternator manufactured for applicants' assignee extended to include the data on an alternator manufactured before the invention or in accordance with Figure 4. This alternator has a rating of 300 kw. at 10,000 cycles. The stator length is 17 inches for all three types of construction. Comparative data is as follows:

|  | Prior Practice | Figs. 1-3 | Fig. 4 |
| --- | --- | --- | --- |
| Diameter of stator, inches | 36 | 31¾ | 29¼ |
| Total weight of strip required to make stator and rotor, pounds | 6,350 | 4,750 | 4,200 |
| Savings in metal, pounds |  | 1,600 | 2,150 |
| Percent savings |  | 25.2 | 33.9 |
| Stator weight, pounds | 2,550 | 1,390 | 890 |
| Savings in metal, pounds |  | 1,260 | 1,660 |
| Percent savings |  | 49.5 | 65 |

It will thus be seen that embodiments of the invention have been described which accomplish the objects of the invention and others and enable rotating electric equipment to be constructed having a minimum external diameter stator without danger of flux saturation or of a pinch point in the magnetic circuit behind the field-coil slots and that a considerable savings in the use of expensive magnetic material can be obtained.

Obviously, there are other embodiments of the invention which can be designed and constructed after a reading and understanding of this specification which will accomplish the objects and functions of the invention but which will differ radically in appearance and arrangement from the embodiment described. It is our intention to include all such alternative embodiments, insofar as they come within the scope of the appended claims which are attached hereto for the purpose of particularly pointing out and defining the invention.

Having thus described our invention, we claim:

1. An inductor alternator comprised of a stator and a rotor in operative relationship, said stator including a plurality of field poles facing said rotor, each field pole having a plurality of armature poles on the rotor-facing surface thereof, each armature pole having a slot over the length thereof, said rotor having a plurality of slots over the length thereof, the pitch of the rotor slots being different than the pitch of the armature-pole slots, field-coil slots between said field poles, said field poles being integrally connected at the outer edge by a narrow portion bridging said field-coil slots, said portion having a cross-sectional area insufficient to carry the field-coil flux without saturating and a flux-bridging member for each field-coil slot disposed outside of said stator member in aligned relationship with said field-coil slots, said member having a width greater than the width of said field-coil slots and a radial thickness sufficient that when taken into consideration with the narrow portion joining said field poles, the area of magnetically-permeable material behind the field-coil slots is sufficient to carry the field-coil flux without saturating.

2. An inductor alternator comprising a stator and a rotor in operative relationship, said stator including a plurality of field poles facing said rotor, each field pole having a plurality of armature poles on the face thereof, each armature pole having a slot over the length thereof, said rotor having similar slots on the stator-facing surface thereof but of a pitch different than the pitch of the armature-pole slots, armature windings about said armature poles, field-coil slots between said field poles, the radial depth of said field-coil slots approximating but being less than the radial depth of said field poles, field coils in said field-coil slots, and a flux-bridging member disposed radially outwardly of said field-coil slots in flush-abutting engagement with the outer surfaces of said field poles on both sides of said field-coil slots, said member having an appreciable cross-sectional area in a radial plane through said coil slots whereby to provide a high-permeance path for the field-coil flux.

3. In rotating electrical equipment, a stator comprised of a plurality of field poles formed of magnetically-permeable material having an inner surface defining a rotor opening and an outer surface, field-coil slots between each of said poles, said poles having a radially narrow portion integral therewith extending behind said field-coil slots, said portion having an area insufficient to handle the field-coil flux and a flux bridge in flush-abutting engagement with the outside of said field poles and said portion on both sides of said coil slots having a radial thickness sufficient to provide a high-permeance path for the field-coil flux.

4. In rotating electrical equipment, a stator comprised of a plurality of field poles formed of magnetically-permeable material and having an inner surface defining a rotor opening and an outer surface, said poles having field-coil slots of an appreciable radial depth relative to but less than the radial thickness of said poles whereby the flux permeance of the material immediately behind the slots is insufficient for the required field-pole flux density and a flux-bridging member of magnetically-permeable material disposed radially outwardly of each slot in engagement with the outer surfaces of said field poles, said member having a width greater than the width of said slots and a radial thickness sufficient to increase the permeance of said area to the desired amount.

5. In rotating electrical equipment, a stator comprised of a stack of thin circular magnetically-permeable laminations having an inner surface defining a rotor opening and an outer surface, said inner surface having a plurality of field-coil slots therein forming field poles therebetween, the radial depth of said slots approaching the radial depth of said laminations whereby the radial depth of laminations outwardly of said slots is insufficient to carry the field-coil flux without saturation and a flux-bridging member of greater width than said slots disposed in flush engagement with said outer surface opposite each slot, said member having a radial thickness sufficient to carry the maximum field-pole flux without saturation.

6. In rotating electrical equipment, a stator comprised of a cylindrical sleeve of magnetically-permeable material having the characteristics of low eddy-current losses, said sleeve having an inner surface defining a rotor opening and an outer surface, said inner surface having a plurality of field-coil slots forming field poles therebetween, field coils in said slots, the portion of said sleeve radially outwardly of said slot being insufficient in cross-sectional area to carry the flux generated by said field coils without saturating and a flux-bridging member of greater circumferential width than said slots disposed in flush engagement with said outer surface opposite each slot, said member having a radial thickness sufficient to increase the cross-sectional area of the portion of said sleeve behind said slots to carry the maximum flux generated by said field coils without saturation.

7. The combination of claim 3 wherein a housing surrounds said stator and said flux bridges, said housing being generally in abutting engagement with the outer surface of said flux bridges and being otherwise spaced from the outer surfaces of said field poles.

8. In rotating electrical equipment, a generally circular housing, a plurality of pole members positioned in equiangularly spaced relationship around the interior of said housing, the outer surfaces of said pole being spaced from the inner surface of said housing, the spacing of said pole providing field-coil slots therebetween and a longitudinally extending, rigid, magnetically-permeable member radially outward of each slot and extending generally the entire length thereof positioned in the space between said member and having a circumferential width greater than the circumferential width of said field-coil slots.

EDWARD J. KACZOR.
CLARENCE F. SCHWAN.

References Cited in the file of this patent

UNITED STATES PATENTS

| Number | Name | Date |
|---|---|---|
| 427,294 | Brace | May 6, 1890 |
| 1,173,089 | Bergman | Feb. 22, 1916 |

FOREIGN PATENTS

| Number | Country | Date |
|---|---|---|
| 120,030 | Australia | Oct. 12, 1943 |